US010436953B2

(12) United States Patent
Tilleman

(10) Patent No.: US 10,436,953 B2
(45) Date of Patent: Oct. 8, 2019

(54) ARCHED COLLIMATING LENS FORMING A DISK-LIKE ILLUMINATION

(71) Applicant: Rockwell Automation Technologies, Inc., Mayfield Heights, OH (US)

(72) Inventor: Michael M. Tilleman, Brookline, MA (US)

(73) Assignee: Rockwell Automation Technologies Inc., Mayfield Heights, OH (US)

(*) Notice: Subject to any disclaimer, the term of this patent is extended or adjusted under 35 U.S.C. 154(b) by 53 days.

(21) Appl. No.: 15/828,739

(22) Filed: Dec. 1, 2017

(65) Prior Publication Data

US 2019/0170913 A1 Jun. 6, 2019

(51) Int. Cl.
*G02B 3/08* (2006.01)
*G02B 3/00* (2006.01)
(Continued)

(52) U.S. Cl.
CPC .............. *G02B 3/08* (2013.01); *G02B 3/0087* (2013.01); *G02B 3/06* (2013.01); *G02B 5/32* (2013.01); *G02B 27/30* (2013.01)

(58) Field of Classification Search
CPC .......... G02B 3/08; G02B 3/0087; G02B 3/06; G02B 5/32; G02B 27/30; F21V 5/045;
(Continued)

(56) References Cited

U.S. PATENT DOCUMENTS 5,235,467 A * 8/1993 Nagamachi .............. G02B 3/08
359/710
5,450,378 A * 9/1995 Hekker ................ G11B 7/1353
359/15
(Continued)

FOREIGN PATENT DOCUMENTS

CN 1693986 A 11/2005
CN 1886981 A 12/2006
(Continued)

OTHER PUBLICATIONS

Bronzi et al., "Automotive Three-Dimensional Vision Through a Single-Photon Counting SPAD Camera", European Commission FP7-ICT Framework through the "MiSPiA" Project under G.A. 257646, 2015, 14 pages.
(Continued)

*Primary Examiner* — Ryan D Howard
(74) *Attorney, Agent, or Firm* — Amin, Turocy & Watson, LLP

(57) ABSTRACT

An arched, cylindrical Fresnel lens is designed to collimate an optical beam in one plane while allowing the beam to propagate in the orthogonal plane with minimal reflection and efficient transmission. The lens comprises a thin lens body that arches about a vertical axis to yield a hollow cylindrical shape. The lens can comprise refractive areas on one or both of its outward-facing surface or inward-facing surface, the refractive areas comprising a series of parallel angled grooves etched into the lens' substrate. The lens can also be realized by a gradient change of the refractive index in the bulk of the lens material, or can comprise diffractive gratings comprising parallel binary structures. The lens may also comprise a holographic imprint on one of its surface or its bulk, thereby attributing diffractive optical power.

20 Claims, 12 Drawing Sheets

(51) Int. Cl.
*G02B 27/30* (2006.01)
*G02B 3/06* (2006.01)
*G02B 5/32* (2006.01)

(58) Field of Classification Search
CPC ......... B63B 51/02; B63B 45/00; B63B 22/16; F21W 2111/04
See application file for complete search history.

(56) References Cited

U.S. PATENT DOCUMENTS

| | | | |
|---|---|---|---|
| 5,612,821 | A | 3/1997 | Schmutz |
| 6,243,513 | B1 * | 6/2001 | Wade ................. G02B 6/29307 385/24 |
| 6,433,934 | B1 | 8/2002 | Reznichenko et al. |
| 6,563,612 | B1 * | 5/2003 | Aye ...................... G02B 5/0252 359/15 |
| 6,583,937 | B1 | 6/2003 | Wangler et al. |
| 6,611,382 | B2 | 8/2003 | Hashimoto |
| 6,631,016 | B1 | 10/2003 | Klug et al. |
| 6,830,189 | B2 | 12/2004 | Tsikos et al. |
| 7,159,986 | B2 | 1/2007 | Bremer et al. |
| 7,268,950 | B2 | 9/2007 | Poulsen |
| 7,619,824 | B2 | 11/2009 | Poulsen |
| 8,390,914 | B2 | 3/2013 | Woodgate et al. |
| 8,908,159 | B2 | 12/2014 | Mimeault |
| 9,344,705 | B2 | 5/2016 | Oggier et al. |
| 9,360,762 | B2 | 6/2016 | Tychkov |
| 9,696,427 | B2 | 7/2017 | Wilson et al. |
| 2002/0024740 | A1 | 2/2002 | Hashimoto |
| 2002/0043561 | A1 | 4/2002 | Tsikos et al. |
| 2005/0237488 | A1 | 10/2005 | Yamasaki |
| 2010/0283842 | A1 | 11/2010 | Rami et al. |
| 2012/0057345 | A1 | 3/2012 | Kuchibhotla |
| 2013/0050405 | A1 | 2/2013 | Kensuke et al. |
| 2013/0242040 | A1 | 9/2013 | Masuda et al. |
| 2015/0002664 | A1 | 1/2015 | Andreas et al. |
| 2015/0287638 | A1 * | 10/2015 | Park ....................... H01L 21/78 438/462 |

FOREIGN PATENT DOCUMENTS

| | | |
|---|---|---|
| CN | 101142806 A | 3/2008 |
| CN | 102681293 A | 9/2012 |
| CN | 104040370 A | 9/2014 |
| CN | 203892962 U | 10/2014 |
| CN | 104487803 A | 4/2015 |
| CN | 107065159 | 8/2017 |
| EP | 2466905 | 6/2012 |
| EP | 3 144 586 A2 | 3/2017 |

OTHER PUBLICATIONS

European Search Report for European Patent Application No. 16182180.6-1562 dated Feb. 10, 2017, 7 pages.
European Search Report for European Patent Application No. 16182177.2-1562 dated Feb. 2, 2017, 10 pages.
Notice of Allowance for U.S. Appl. No. 14/993,601, dated Jul. 25, 2017, 23 pages.
Extended European Search Report for European Patent Application No. 16182180.6-1562 dated May 23, 2017, 16 pages.
Office Action for U.S. Appl. No. 14/994,323 dated Jun. 16, 2017, 20 pages.
First Office Action received for Chinese Patent Application Serial No. 201610720777.4 dated May 28, 2018, 20 pages. (Including English Translation).
First Office Action received for Chinese Patent Application Serial No. 201610720432.9 dated May 30, 2018, 24 pages. (Including English Translation).
Communication pursuant to Article 94(3) EPC received for EP Patent Application Serial No. 16182177.2 dated Feb. 28, 2019, 4 pages.
Extended European Search Report received for EP Patent Application Serial No. 18209028.2 dated Apr. 9, 2019, 19 pages.
Communication pursuant to Rule 69 EPC received for EP Patent Application Serial No. 18209028.2 dated Jun. 11, 2019, 2 pages.

* cited by examiner

ARCHED COLLIMATING LENS FORMING A DISK-LIKE ILLUMINATION

BACKGROUND

The subject matter disclosed herein relates generally to illumination lenses.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a lens is provided comprising a lens body that arches about an axis to yield a hollow cylindrical shape, wherein the lens body is refractive or diffractive.

Also, one or more embodiments provide an illumination system, comprising an arched lens having a curved profile that arches about an axis to yield a hollow cylindrical profile, wherein the arched lens is at least one of diffractive or refractive; and an illumination source device disposed at or near a focus of the curved profile of the arched lens.

Also, one or more embodiments provide a method for producing a beam of light, comprising receiving, by a lens having a curved profile that arches about a center-line axis, light generated by a light source located at or near a focus of the curved profile, wherein the lens is one of refractive or diffractive; and collimating, by the lens, the light in a first plane while allowing propagation of the light in a second plane that is orthogonal to the first plane.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
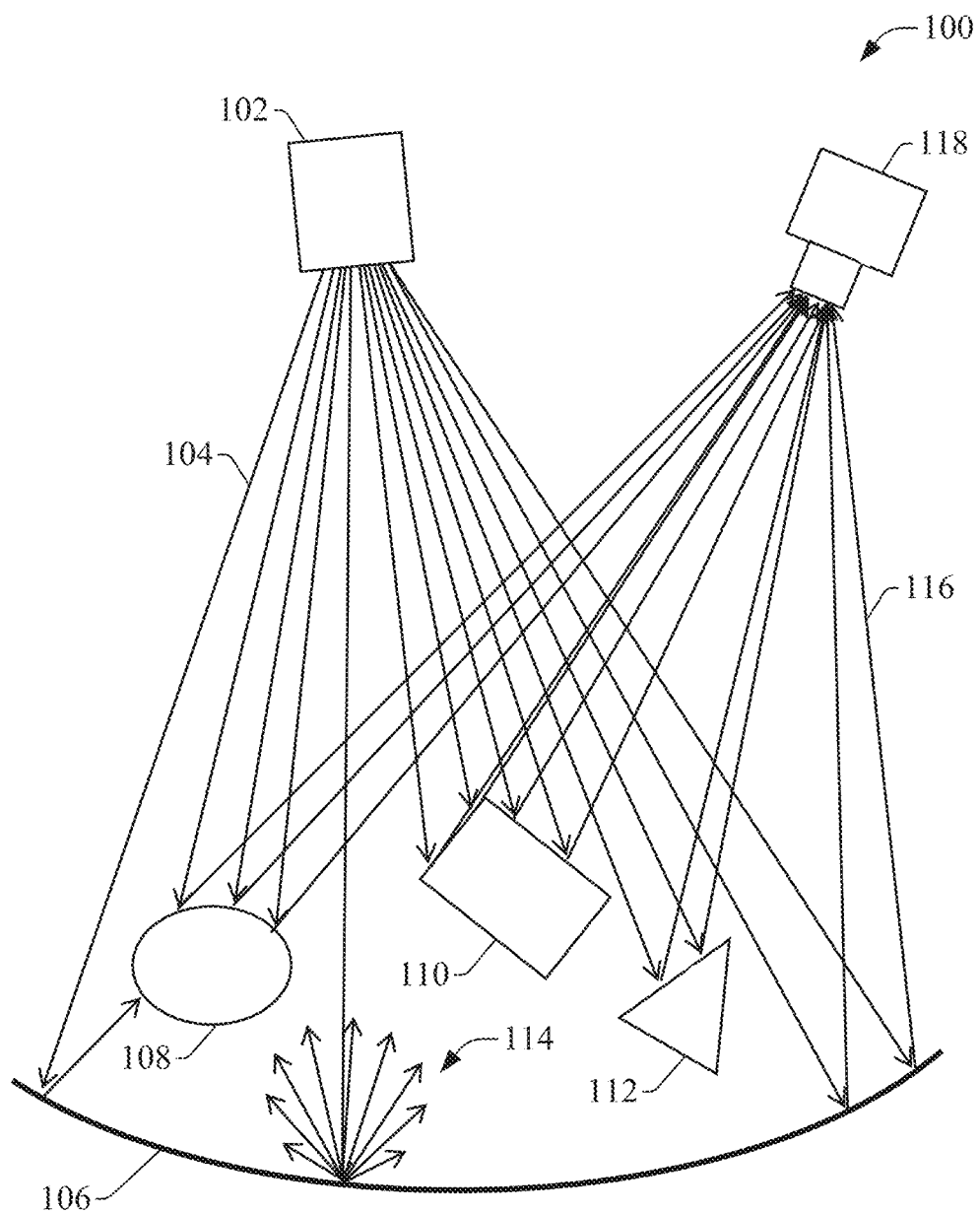
FIG. 1 is a diagram illustrating capture of an image by an example, non-limiting illumination and imaging system, which comprises an illuminator and an imaging system.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Also, the term "VCSEL" which is an abbreviation for "Vertical Cavity Surface Emitting Laser" is used for arrays of VCSELs. State-of-the-art VCSEL arrays contain up to ten thousands of individual VCSELs.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Illumination systems are often used in conjunction with cameras or other types of imaging systems to properly illuminate areas in which ambient light is insufficient to allow the camera to produce an image with a desired contrast and signal-to-noise ratio. FIG. 1 is a diagram illustrating capture of an image by an example, non-limiting illumination and imaging system 100, which comprises an illuminator 102 and an imaging system 118. Illuminator 102 emits light 104 into a viewing area to be imaged. Portions of the emitted light that are incident on solid objects and surfaces within the field of view—such as solid bodies 108, 110, and 112 and wall 106—are scattered by the illuminated objects and surfaces as scattered rays 114. Subsets of the scattered rays 116 are received and collected by the imaging system 118, and image capturing components within the imaging system 118 (e.g., a photodiode array, a charged-coupled device, a complimentary metal-oxide semiconductor, photographic film or emulsion, etc.) record the rays 116 reflected from the objects and surfaces as an image (or as a set of point cloud data in the case of three-dimensional imaging systems).

Illuminator 102 and imaging system 118 can be, for example, components of a commercial camera or a more specialized camera such as a multi-spectral or hyper-spectral imaging camera. Imaging system 100 may also be components of a time-of-flight (TOF) camera (also known as a three-dimensional image sensor) capable of generating distance information for points within the viewing field.

Illumination systems (such as illuminator 102) are typically designed to suit the requirements of a particular type of camera or imaging system. For example, commercial cameras are equipped with a relatively simple flash illuminator to compensate for a deficit of ambient light under dark conditions. Multi-spectral and hyper-spectral imaging systems employ more specialized cameras designed to capture image information at specific electromagnetic frequencies, and therefore use illumination systems that generate light customized for the specific spectral ranges required. With the advent of solid-state illumination sources, such as lasers, VCSELs, and light-emitting diodes (LEDs), which are capable of emitting light at narrow spectral bands, illumination systems are capable of illuminating a viewing space with light directed to specific defined wavelengths while minimizing the effects of background radiation with compatible band-pass filters. Moreover, imaging in the three-dimensional space (3D imaging) requires the collection of many photo-electrons to accurately render the depth of an object, which can place great demands on the illumination system. These requirements call for an illumination system capable of forming an illumination field that overlaps the field-of-view of the imaging system effectively and prudently.

Figure 2:
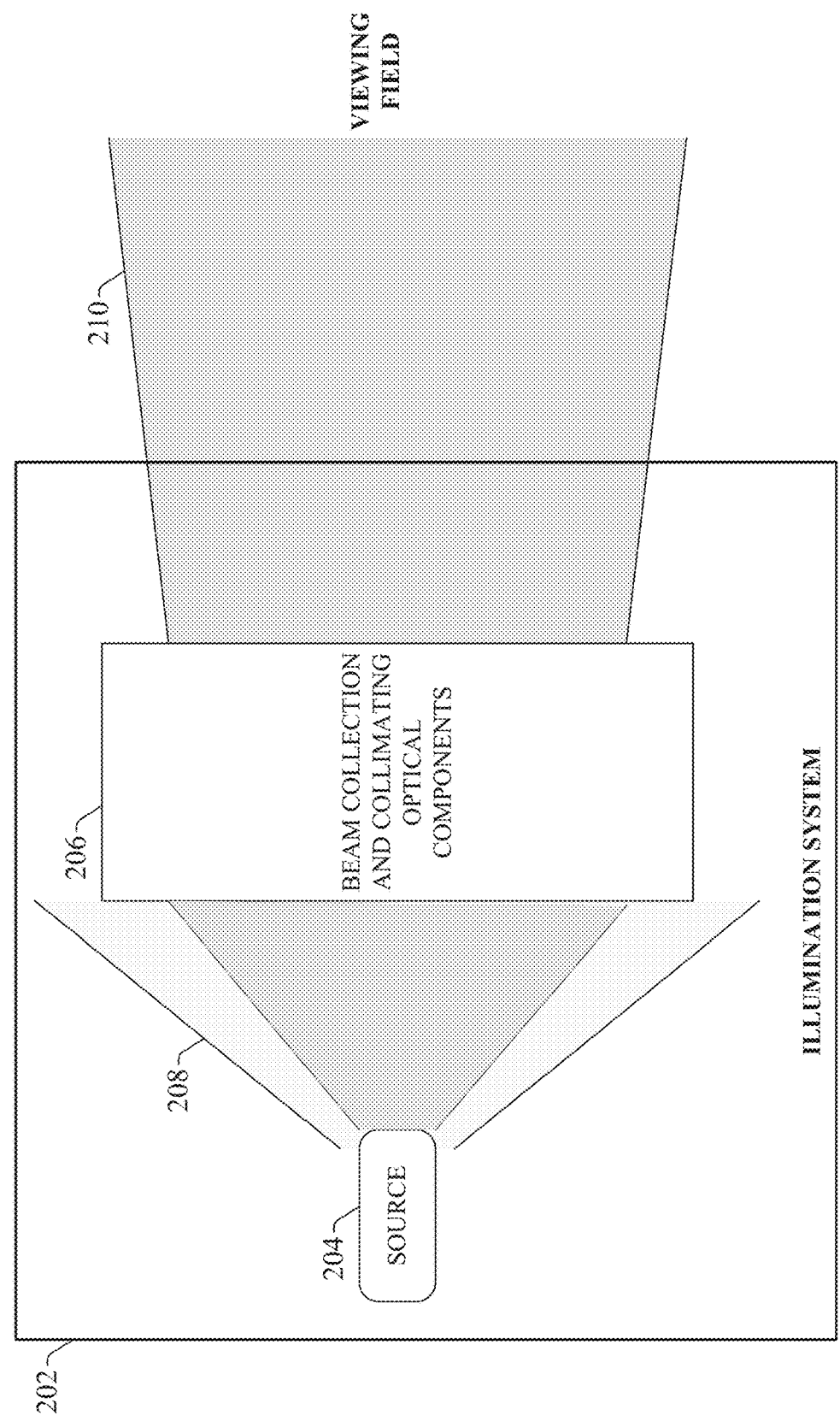
FIG. 2 is a diagram of an example illumination system.

FIG. 2 is a diagram of an example illumination system 202. A given illumination system 202 can comprise a light source 204—e.g., an LED, a laser (e.g., a vertical-cavity surface-emitting laser, or VCSEL), or other type of source—that generates and emits light 208, and optical components 206 that collect, collimate, and direct the light from the source 204 to the viewing field as a processed beam 210. The delivery efficiency of a given illumination system—that is, the percentage of light generated by the source 204 that is ultimately delivered to the viewing field—can be described as the product of the collection efficiency and the transmission efficiency of the system. In general, the collection efficiency describes the percentage of light 208 emitted by the source 204 that is collected by the optical components 206 (e.g., by a collection lens) for further optical processing and transmission. The transmission efficiency describes the percentage of the collected light that is conserved during transmission of the collected light through the optical path of the optical components 206; that is, the percentage of collected light that is not lost through vignetting, reflection, scattering, or absorption during transmission through the illumination system. The delivery efficiency is also at least partially a function of the étendue of the source 204 (or its Lagrange invariant), which is a product of the area of the source 204 and the solid angle at which the source projects its light beam.

To produce a field of illumination (FOI) having a high illumination transmissivity with minimal exit angle and minimal scattering of the illumination, one or more embodiments of the present disclosure provide an arched, cylindrical Fresnel lens that can be used within the context of an illumination system to collimate an optical beam in one plane, while allowing the beam to propagate in the orthogonal plain with minimal or no refraction of the rays, resulting in a substantially disk-like field of illumination (or a disk sector shape in the case of systems that produce FOIs with horizontal angles of equal to or less than 360 degrees). In one or more embodiments, the arched lens has a complete 360 degree cylindrical shape. In other embodiments, the arched lens has a partial 360 degree cylindrical shape, which can be useful in rendering a rigid and stable mechanical structure. As a result of the arched topology of the lens, light rays emitted from a point source (or nearly a point source) that expand in space travel a substantially equal distance to the interior surface of the Fresnel lens in some embodiments. Thus, if the point source is disposed at or near the focus of the curved profile of the Fresnel lens, the lens collimates the rays of the expanding optical beam in the designated plane. In the case of a finite source, the collimation is limited by beam étendue, consistent with the radiance theorem. On the other hand, disposing the point source at a normal angle to the incident rays in the plane where the lens has no dioptric power ensures minimal reflection and high transmission, yielding a high transmission efficiency.

In one or more embodiments the source can be disposed on an imaginary line coinciding with the center-line axis of the circular arch of the arched lens. In other embodiments, the source can also be disposed on an imaginary plane coincident with the tangential plane comprising the loci of the optical axes of the arched lens. The intersection of the center-line axis and the tangential plane be referred to as point O, in which case the emanating beam refracted by the lens, whose focus lies on the center-line axis, is substantially collimated and collinear with the tangential plane. In still other embodiments, the source can be disposed on an arbitrary point P on the center-line axis, in which case the emanating beam refracted by the lens is substantially collimated tilted at an angle to the tangential plane. If the intersection of the center-line axis and the tangential plane is referred to as point O, the angle of the collimated beam relative to the tangential plane is equal or substantially equal to the ratio of the distance between points O and P and the focal length of the lens. In yet other embodiments, the point P on which the source is disposed can be dynamically varied along the center-line axis, in which case the emanating beam refracted by the lens is substantially collimated and its angle is slewed relative to the tangential plane, causing an effect of a fan-like slewing of a cone of light. In such embodiments, the output beam has a conic shape whose tilt angle relative to the tangential plane is dynamically modulated in proportion to the slewing amplitude of the source.

In some embodiments, the arched Fresnel lens can form a circular arch shape that subtends angles from a few degrees up to a full circle. In an example embodiment, the lens may have an arch of approximately 270 degrees. Also, as an alternative to the circular arch shape, some embodiments of the arched Fresnel lens may conform to other types of curve shapes, including but not limited to elliptical, parabolic, hyperbolic, or an arbitrary free shape.

In still other embodiments, the focal length of the lens can be longer than the radius of the cylinder arch, in which case the refracted outcoming beam expands in the sagittal dimension, though at a smaller angle than the beam incident on the lens. In further embodiments, the focal length of the lens can be shorter than the radius of the cylinder arch, in which case the refracted outcoming beam is focused in the sagittal dimension, forming a focal ring at a certain range around the arched lens.

Figure 3:
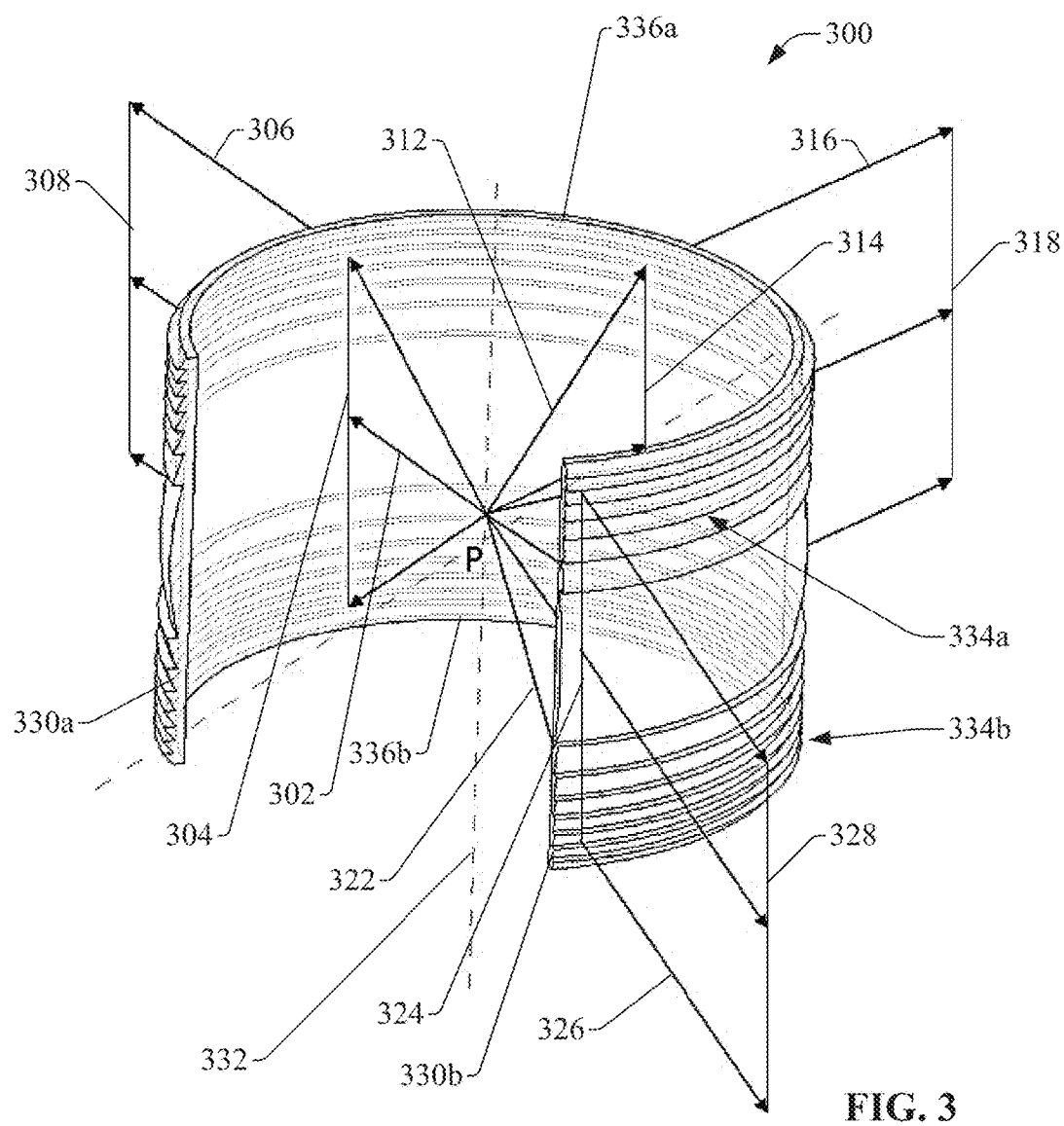
FIG. 3 is a schematic of an example embodiment of an arched cylindrical Fresnel lens.

FIG. 3 is a schematic of an example embodiment of the arched cylindrical Fresnel lens 300. Lens 300 comprises a thin lens body that is arched about an imaginary vertical axis, or center-line axis 332. In this example embodiment, the arch of the lens 300 about axis 332 is substantially circular (specifically, an open circle having end points that do not meet), yielding a hollow cylindrical shape. However, some embodiments of lens 300 may comprise arch profiles of other shapes—including but not limited to elliptical, parabolic, hyperbolic, or a free shape—without departing from the scope of this disclosure. Also, the example lens 300 depicted in FIG. 3 subtends an angle of approximately 270 degrees about the center-line axis 332 (that is, imaginary lines drawn from the vertical edges 330a and 330b of the lens 300 to the axis 332 of the cylinder form an angle of approximately 270 degrees with its vertex lying on the axis 332). However, some embodiments of lens 300 can subtend other angles, or may comprise a continuous, fully circular cylinder in which there are no vertical edges 330a or 330b.

Lens 300 can be made of any suitable material, including but not limited to optical polymer or glass. In the illustrated example, lens 300 comprises an open cylinder in which vertical edges 330a and 330b of the cylinder (the edges substantially parallel with the axis 332 of the cylinder) do not meet, resulting in a "C" shaped profile about the center-line axis 332. It is to be appreciated, however, that some embodiments of the arched cylindrical lens may comprise fully circular profiles (or profiles of other closed curved shapes) with no vertical edges 330a and 330b.

In the illustrated example, two refractive areas 334a and 334b traverse the upper and lower portions, respectively, of the outward-facing surface of the arched lens 300. Refractive areas 334a and 334 comprise a number of adjacent, parallel angled grooves that traverse the outward-facing surface of the lens 300 from the first vertical edge 330a to the second vertical edge 330b (though it is not necessary for the grooves to traverse the full distance between the vertical edges 330a and 330b). The grooves of refractive areas 334a and 334b run substantially parallel to the upper and lower edges 336a and 336b of the lens 300, following the lens' curve profile. It is to be understood, however, that it is the full length of the lens that constitutes the dioptrical power of the lens in the sagittal dimension.

Figure 4:
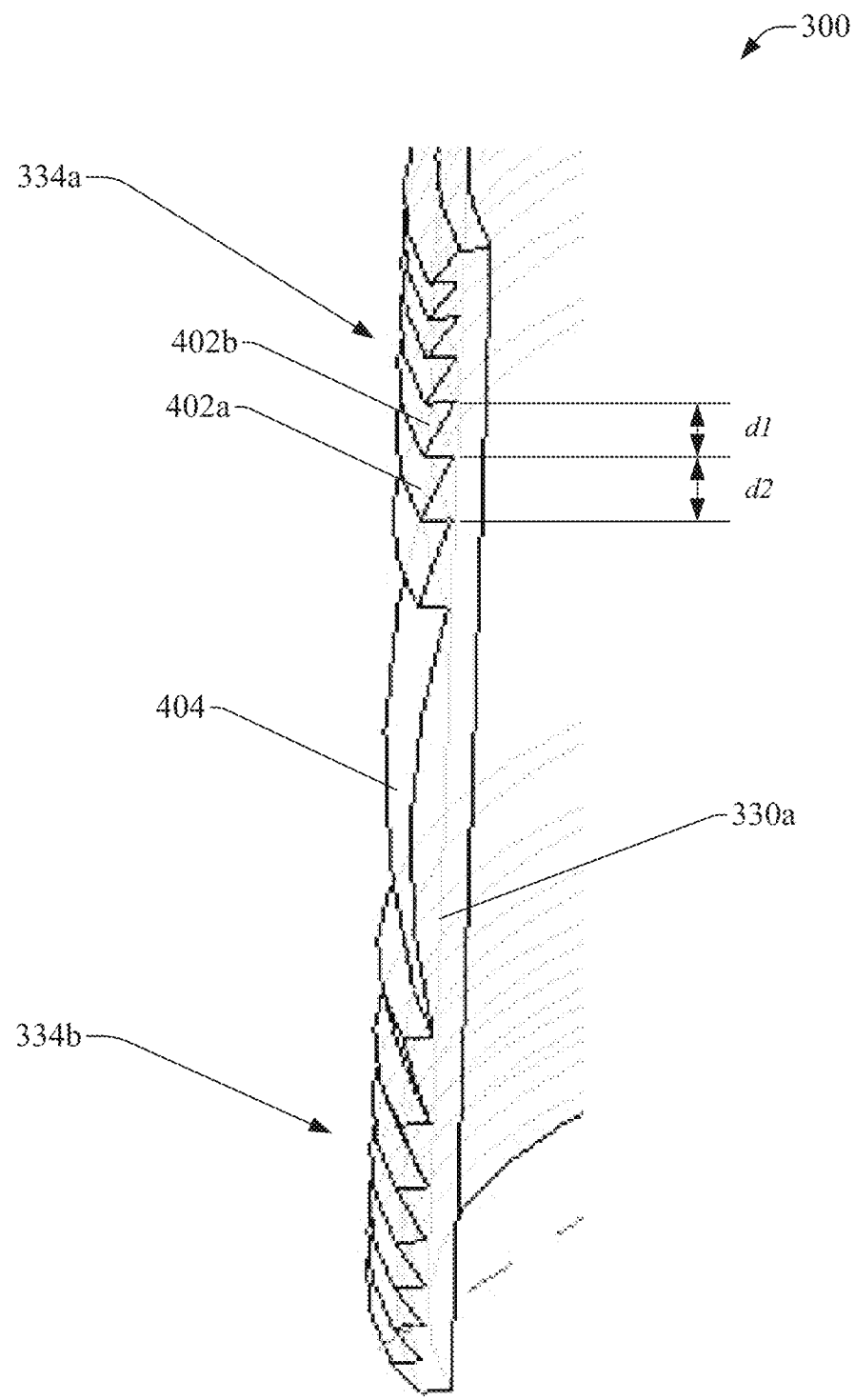
FIG. 4 is a close-up view of a vertical edge of the arched cylindrical Fresnel lens illustrating the diffraction gratings.

FIG. 4 is a close-up view of vertical edge 330a illustrating the profile of refractive areas 334a and 334b in more detail. In the illustrated example, refractive areas 334a and 334b are formed above and below a convex surface 404 on the outward-facing surface of the lens 300. Similar to the grooves of the refractive areas 334a and 334b, the convex surface 44 horizontally traverses the middle section of the lens 300 from the first vertical edge 330a to the second vertical edge 330b (or a portion of the distance between the vertical edges). The refractive areas 334a and 334b and the convex surface 404 form a symmetrical cross-sectional profile.

Refractive areas 334a and 334b comprise a number of angled refractive surfaces 402, each of which forms one side of one of the angled grooves. Refractive surfaces 402 are angled relative to the vertical, with the pitch of each refractive surface 402 directed toward the convex surface 404. In the illustrated embodiment, the distances between adjacent grooves of the refractive areas 334a and 334b become smaller the farther the grooves are from the convex surface 404 (e.g., distance d1 is smaller than distance d2, etc.). Similarly, the pitches of the refractive surfaces 402 become greater the farther the angled surfaces are from the convex surface 404 (e.g., the pitch of refractive surface 402b is larger than that of refractive surface 402a). The angled grooves of refractive areas 334a and 334b comprise parallel grooves in non-Euclidean space, in that that the grooves reside in respective parallel planes and thus never intercept one another. It is to be appreciated, however, that other refractive or diffractive formations on the surface of lens 300, or in the body of lens 300, are also within the scope of one or more embodiments. For example, in some embodiments the lens surface may comprise non-angled grooves, or grooves with uniform groove spacing. In other embodiments, the parallel grooves can be formed on the inward-facing surface of the lens 300. In still other embodiments, both the outward- and inward-facing surfaces can be engraved with parallel grooves. In some such embodiments, the two sets of grooves may have radii of curvature complying to a certain shape factor which eliminates coma and minimizes spherical aberrations.

In still other embodiments the outward- and inward-facing surfaces of lens 300 can be smooth, while the substrate material is infused with dopants, such as certain metals, in a manner creating a gradient refractive index (GRIN) in the bulk of the lens 300. By forming a quadratically changing GRIN the lens is attributed with dioptric power.

In contrast to some conventional Fresnel lenses, in which grooves are formed as concentric circular grooves, the grooves of lens 300 are parallel arches that bend along the arched, cylindrical lens profile. It is to be appreciated that some embodiments of lens 300 may comprise other types of grooves, such as grooves having a uniform groove depth or a uniform radial distance between grooves. Also, as will be discussed below, the dioptric power of the arched cylindrical lens 300 may be realized using other formations in some embodiments, including but not limited to holographic optical elements (HOE).

Returning now to FIG. 3, arched lens 300 is depicted with light rays emitted from a point source P located inside the lens. The arrows from point source P to the interior surface of lens 300 represent a number of rays, which are a subset of all the rays emitted from the point source P. A first bundle of rays 302 expand in the sagittal plane formed by the locus of the rays incident on vertical line 304 on the interior lens surface. Rays 302 are refracted by the arched lens 300 and propagate as a collimated beam ensemble 306 in the sagittal plane formed with the wavefront 308, thus flattening the beam. A second bundle of rays 312 emanating from the point source P expand in a second sagittal plane formed with the locus of the rays incident on vertical line 314 on the interior lens surface. Rays 312 are refracted by the arched lens 300 and propagate as a collimated beam ensemble 316 in the sagittal plane formed with the wavefront 318 of the rays. A third bundle of rays 322 emanating from the point source P expand in a third sagittal plane formed with the locus of the rays incident on vertical line 314 on the interior lens surface. Rays 322 are refracted by the arched lens 300 and propagate as a collimated beam ensemble 326 in the sagittal plane formed with the wavefront 328 of the rays. Although only three bundles of rays are illustrated in FIG. 3 for clarity, similar refraction and collimation is performed by lens 300 for the rays of all sagittal planes incident on the interior surface of lens 300. Together, the resulting collimated rays (e.g., collimated beam ensembles 306, 316, 326, and all other beam ensembles collimated by lens 300) yield an optical beam that forms a substantially rectangular field of illumination (FOI) whose vertical angular footprint is slender.

In some embodiments, the focal length of lens 300 can be longer than the radius of the cylindrical arch of the lens 300. In such embodiments, the refracted beam is expanded in the sagittal dimension, though at a smaller angle than the beam incident on the lens 300. In other embodiments, the focal length of the lens 300 can be shorter than the radius of the cylindrical arch of the lens 300. In such embodiments, the refracted beam is focused in the sagittal dimension, forming a focal ring at a range around the arched lens 300.

Figure 5:
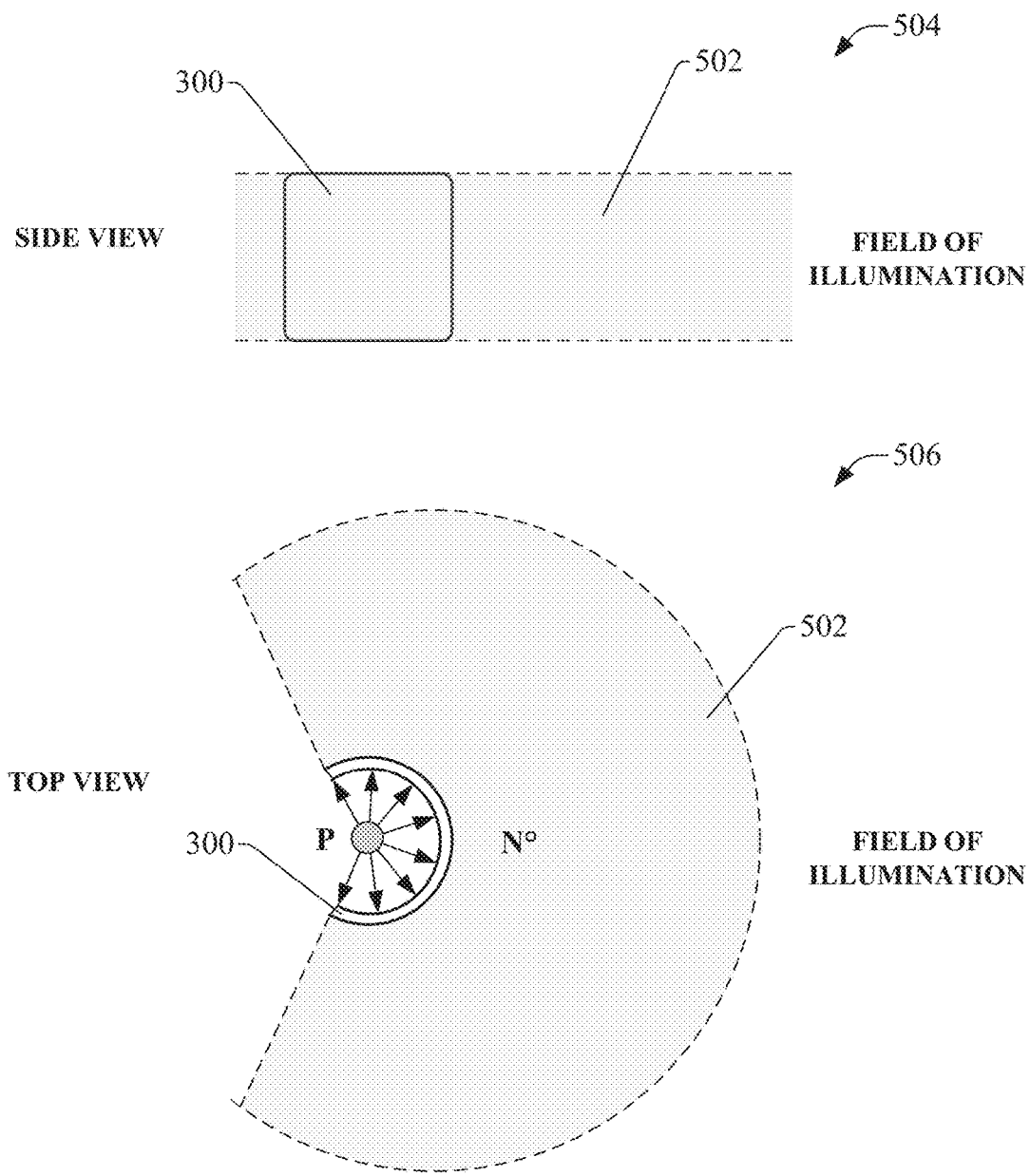
FIG. 5 is a side view and a top view of the arched cylindrical Fresnel lens projecting a disk-like field of illumination.

FIG. 5 is a side view 504 and a top view 506 of lens 300 projecting a field of illumination 502. As shown in the side view 504, the FOI 502 has a substantially rectangular profile due to collimation of the light in the sagittal plane. Owing to diffraction, the rectangle vertices of the FOI 502 will become gradually rounded at a long range from the arched lens 300. As shown in the top view 506, the FOI's horizontal angle of projection N degrees may be a function of the angle swept by the curved profile of the lens 300, or may be less than the angle of the curved lens profile if the light source emits a more focused beam having a horizontal angle that is less than the angle of the lens's curved profile. As illustrated in FIG. 5, lens 300 has no power in the presented tangential plane, refracting optical rays only in the sagittal dimension (perpendicular to the page), therefore the disk-like expansion of the beam in the tangential plane is caused by optics disposed inside the cavity of the lens. Lens 300 produces an FOI having a shape that generally conforms to a disk sector, having a substantially flat vertical cross-section and a substantially circular vertical cross-section. Although the FOI 502 illustrated in FIG. 5 has a shape conforming to a disk sector, embodiments of lens 300 having a 360 degree profile can produce a fully disk-shaped FOI when a point source having a 360 degree angle of illumination is used.

Although the example depicted in FIGS. 3 and 4 depict lens 300 as having refractive areas 334a and 334b comprising parallel refractive surfaces, some embodiments of arched lens 300 can replace these refractive grooves with diffractive areas in order to produce the disk-like FOI illustrated in FIG. 5. For example, some embodiments of arched lens 300 can be realized by a diffractive optical element (DOE), such that the angled refractive grooves shown in FIGS. 3 and 4 are replaced by parallel binary structures that traverse the outward-facing surface of the lens 300 along the curve profile (that is, substantially parallel with upper and lower edges 336a and 336b), yielding a diffraction grating that replaces the refractive structure of the Fresnel lens. In other embodiments, the dioptric lens power can be attributed by diffractive means. The class of diffractive optical elements (DOE) can be either a binary lens, where scaled groves—which are parallel in this case—are engraved in the substrate, thus modulating the optical path of the rays in the lens and causing their controllable diffraction, or of a lens surface or bulk with alternating refractive index, which modulates the optical phase of the rays in the lens causing their controllable diffraction. The latter can be implemented using holography. Also, in other embodiments, the refractive surface can be replaced by an imprinted phase pattern (e.g., a holographic optical element, or HOE) formed on the outward-facing or inward-facing surface of the lens, or formed within the bulk of the lens, resulting in a diffraction-based lens function that yields an FOI similar to that depicted in FIG. 5. In yet other embodiments, the holographic optical element (HOE) can be constructed as a thin film with a holographic pattern glued onto a transparent, dioptrically unpowered lens substrate. In yet other embodiments, the holographic pattern can be imprinted in the bulk of the material. In general, any arched lens having one or more refractive or diffractive optical regions traversing the arched profile of the lens is within the scope of one or more embodiments of this disclosure. Such optical regions—e.g., the refractive areas 334a and 334b, areas comprising parallel binary structures, HOEs formed on the surface of the lens or within the bulk of the lens, etc.—can be formed with the ability to focus an incident beam, or collimate an expanding beam, at a high efficiency for a selected diffraction order.

Figure 6:
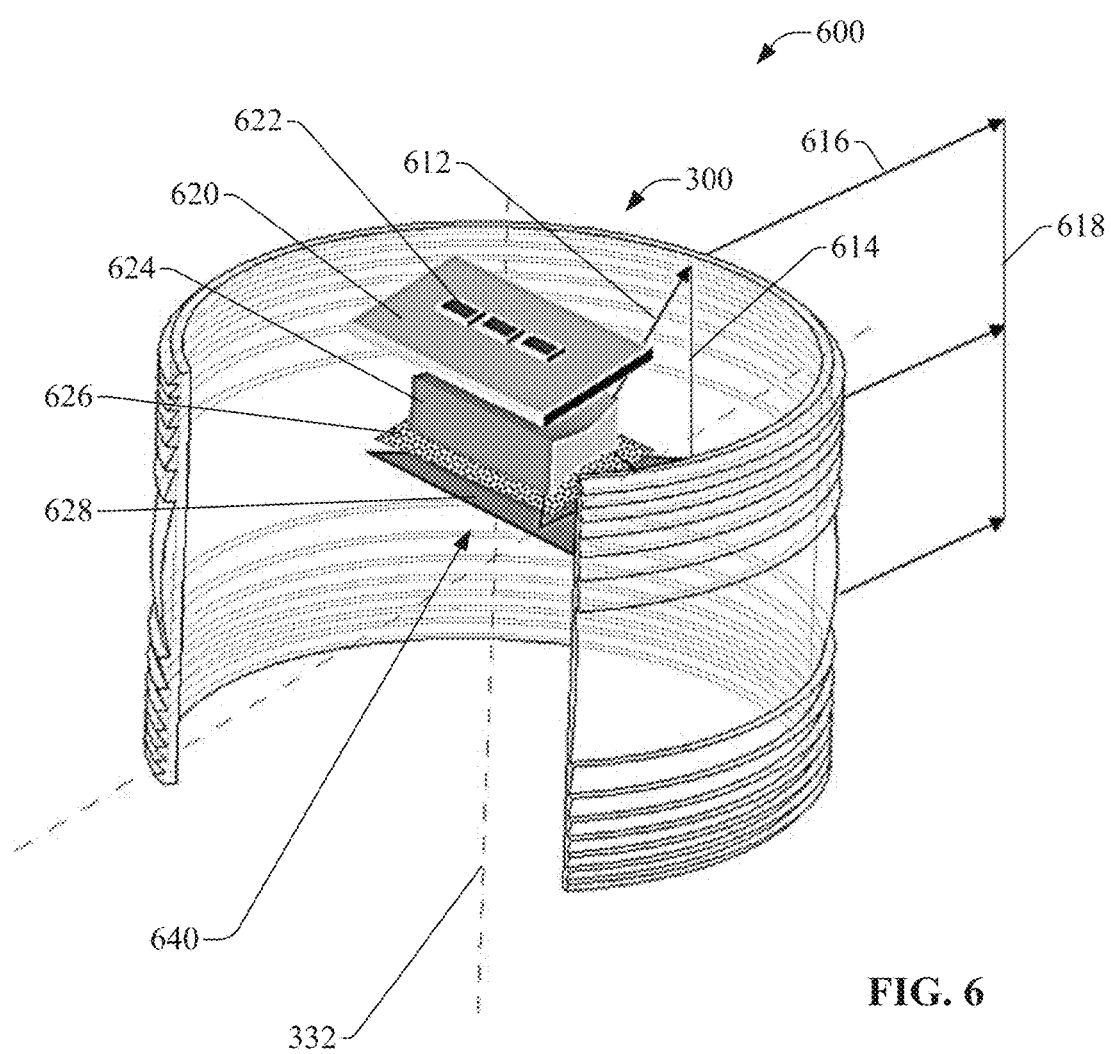
FIG. 6 is a diagram illustrating an example elementary unit comprising an arched cylindrical Fresnel lens and a light source that uses vertical-cavity surface-emitting lasers (VCSELs) as sources.

FIG. 6 illustrates an example elementary unit 600 comprising arched cylindrical Fresnel lens 300 and a light source device 640 that uses vertical-cavity surface-emitting lasers (VCSELs) as sources. It is to be appreciated, however, that embodiments of elementary unit 600 that employ other types of light sources—including but not limited to LED or laser sources—are also within the scope of one or more embodiments. This example embodiment is capable of illuminating an FOI of 2×100 degrees. Three VCSEL dies 622, mounted on a horizontal printed circuit board (PCB) 620, radiate light vertically downwards. Radiation emitted by the VCSEL dies 622 is collimated in the tangential plane and expanded in the sagittal plane by a cylindrical negative lens 624. The resulting collimated light is then folded at 90 degrees by a planar mirror 628 directing the radiation beams to an optical diffuser 626. The diffuser 526 may be either a refractive or diffractive device, scattering and homogenizing the beam in the tangential plane. In one or more embodiments, diffuser 626 may be realized by two lens arrays set in tandem to one another, forming a beam homogenizer. In other embodiments, diffuser 626 may be realized by an engineered diffuser. In any case, the diffuser 626 affects the incident beam by expanding the beam at the exit. In some embodiments, the expansion is not axisymmetrical, but rather expands the beam at one angle in the tangential plane and at a different angle in the sagittal plane. In some example scenarios, the angular expansion may be 1040, 1060, 130, 160, 190, or other angles. The expansion of the exit beam can be given by the square root of the square sum of the incidence angle and the diffuser expansion angle in the corresponding plane.

In one or more embodiments, the arched cylindrical Fresnel lens 300 is set perpendicularly to the illumination beam, such that the exit beam from the diffuser 626 is incident on the inner surface of the lens, which collimates the beam in the sagittal plane as described above. The cylindrical Fresnel lens 300 can achieve high illumination transmissivity and minimal exit angle, with minimal scatter of the illumination. For this reason, the lens 300 can be designed as a thin component having a relatively small depth and pitch. In one or more embodiments, the lens 300 can be made of poly(methyl methacrylate) (PMMA) having the following parameters: radius of 14 mm, conic constant −1, depth of 200 micrometers, and thickness of 2 mm. In other example embodiments, lens 300 can be made of polycarbonate with the following parameters: radius 20 mm, conic constant −1, groove frequency of 2/mm, and thickness of 1.5 mm.

In the example elementary unit 600, the arched lens 300 collimates the beam ensemble 612 emitted by the VCSEL light source device 640, thus refracting to beam ensemble 616 in the sagittal plane having a wavefront 618. These rays are representative of all the rays propagating radially relative to the arched lens 300. The position of the light source device 640 along the center-line axis 332 can determine a tilt of the beam ensemble 616 relative to the tangential plane.

For example, in some embodiments the light source device 640 can be disposed at or near an intersection between the center-line axis 332 and the tangential plane defined by the loci of the optical axes of the arched lens 300, referred to herein as point O. In such embodiments, the emanating beam refracted by the lens is substantially collimated and collinear with the tangential plane. In other embodiments, the light source device 640 can be disposed on a point P along the center-line axis 332 that is offset relative to point O. In such embodiments, the emanating beam refracted by the lens 300 is substantially collimated and tilted at an angle relative to the tangential plane, in a direction determined by the direction of the offset of point P relative to point O. The angle of the collimated beam can be determined by the ratio of the distance between point O and point P and the focal length of lens 300. In still other embodiments, the light source device 340 can be dynamically varied or oscillated along the center-line axis 332. In such embodiments, the collimated beam refracted by the lens 300 has an angle that slews relative to the tangential plane. This fan-like slewing produces a cone of light.

Figure 7:
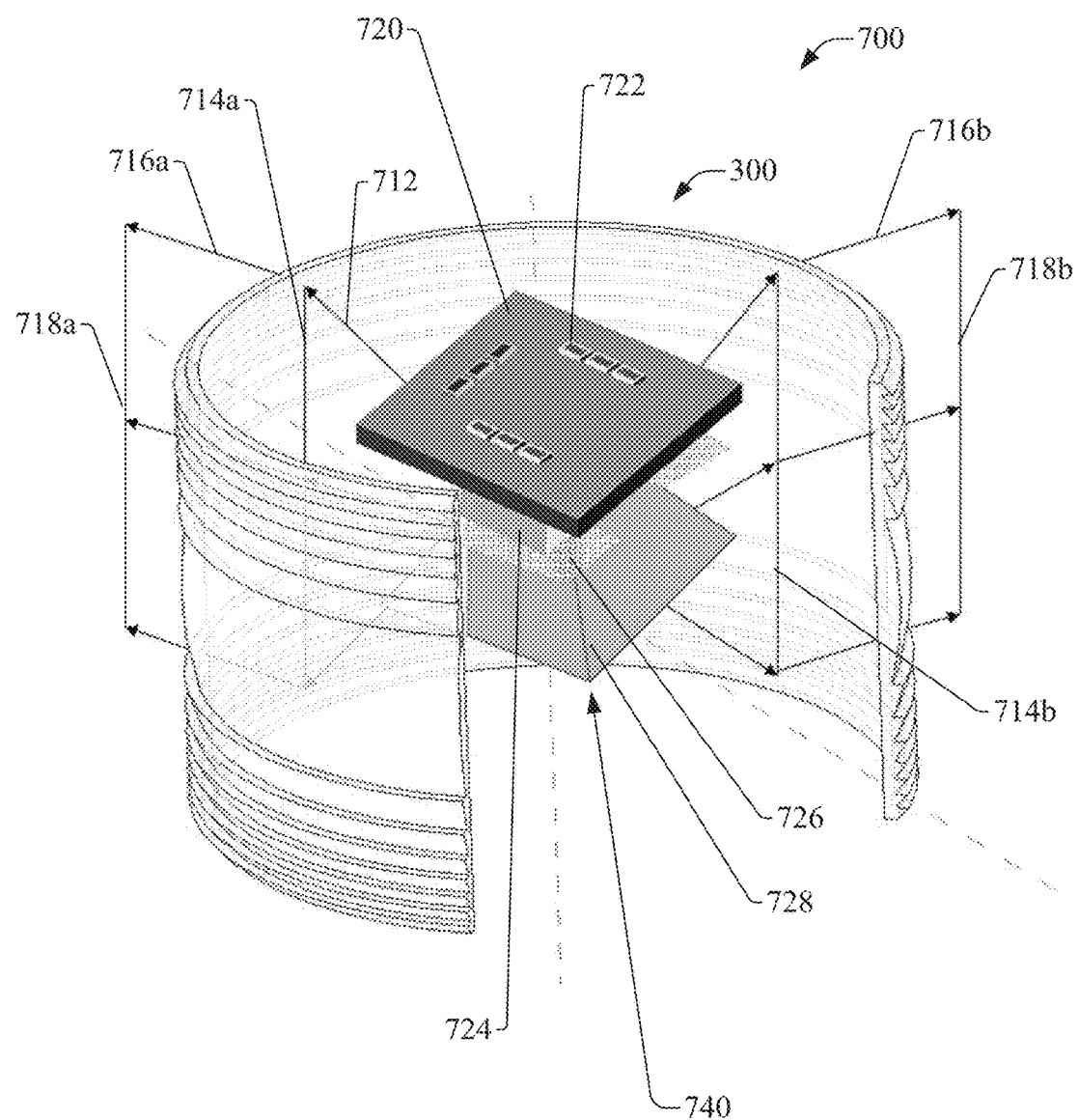
FIG. 7 is a diagram illustrating an example elementary unit that uses VCSELs as light sources, and which is capable of illuminating an FOI of 2×270 degrees.

FIG. 7 illustrates an example elementary unit 700 having a light source device 740 that uses VCSELs as light sources, and which is capable of illuminating an FOI of 2×270 degrees. In this embodiment there are nine VCSEL dies 722 mounted on a horizontal PCB 720. The VCSEL dies 722 radiate vertically downward, and their emitted radiation is expended in the sagittal plane by a cylindrical negative lens 724. The radiated rays from the cylindrical negative lens 724 are then diffused by a set of optical diffusers 726. Each diffuser 726 may be one of a refractive device or a diffractive device, scattering and homogenizing the beam in the tangential plane. In some embodiments, the diffuser 726 may be realized by two lens arrays set in tandem to one another, forming a beam homogenizer. In other embodiments, the diffuser may 726 be realized by an engineered diffuser. In any case, the diffuser 726 affects the incident beam by expanding the beam at the exit. The radiation is then folded at 90 degrees by a set of planar mirrors 728, which are arranged in a pyramid formation in the example depicted in FIG. 7. Thus, the radiation is direct to the interior surface of arched cylindrical Fresnel lens 300, which collimates the incident beam 712 in the sagittal plane and facilitates unperturbed propagation of the collimated beam 716 in the horizontal plane. In some embodiments, the expansion of light by diffuser 726 is not axisymmetrical. Rather, the diffuser 726 can expand the beam at one angle in the tangential plane and at a different angle in the sagittal plane. In some embodiments, the arched cylindrical Fresnel lens 300 can be set perpendicularly to the illumination beam, collimating the beam in the sagittal plane.

Figure 8A:
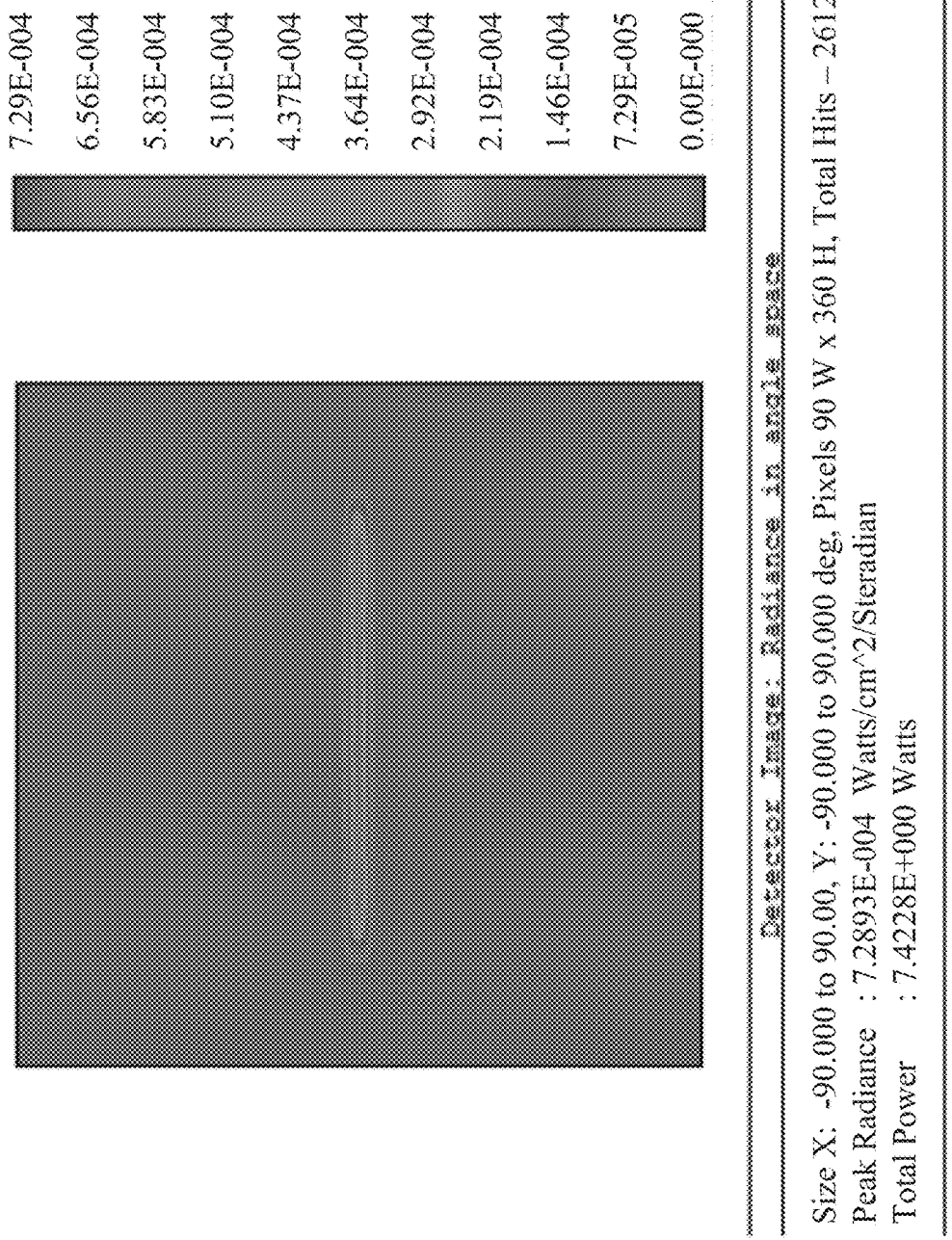
FIG. 8A is a plot of radiance in angle space of −90 degrees to +90 degrees.
Figure 8B:
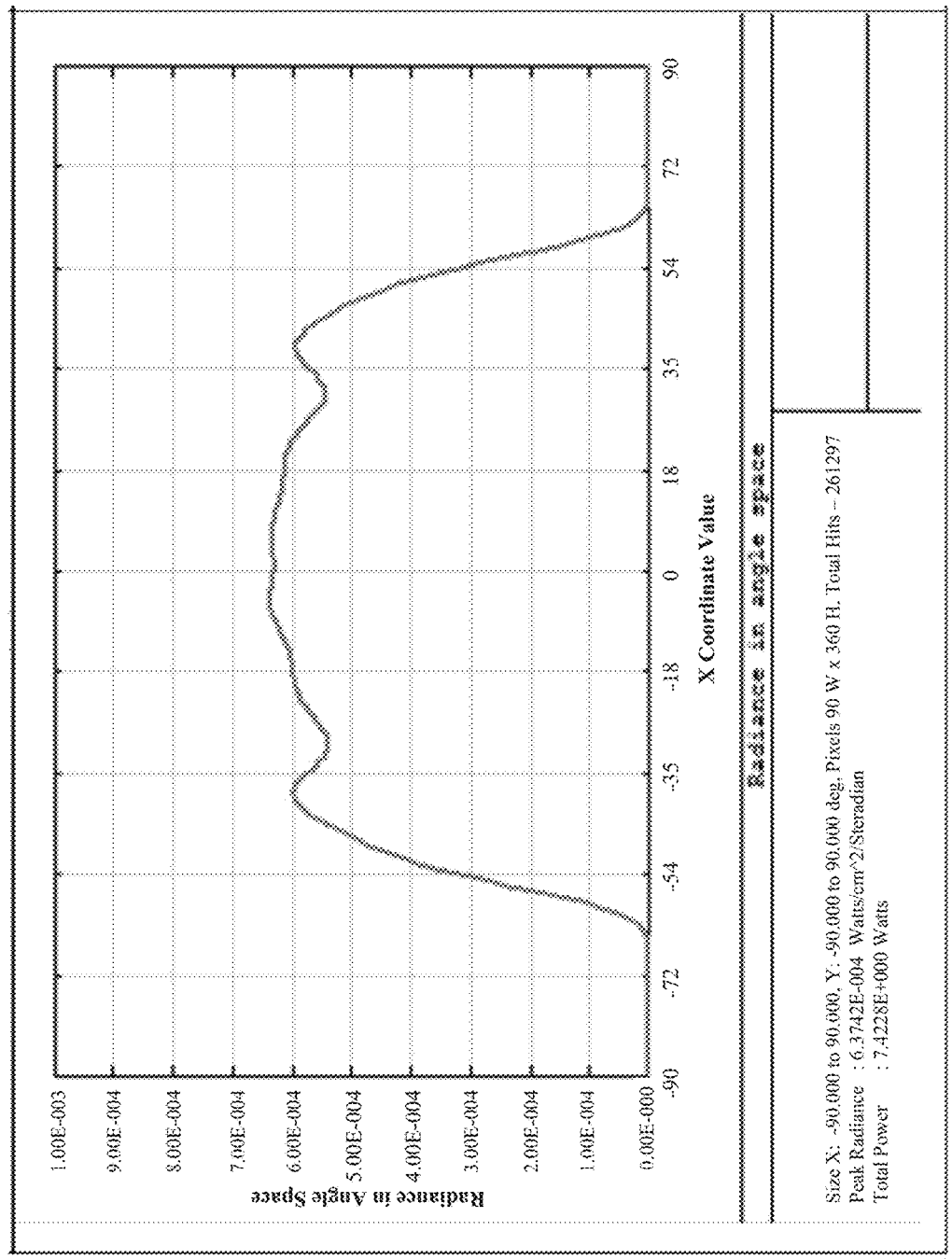
FIG. 8B is a plot of radiance over a horizontal cross-section.
Figure 8C:
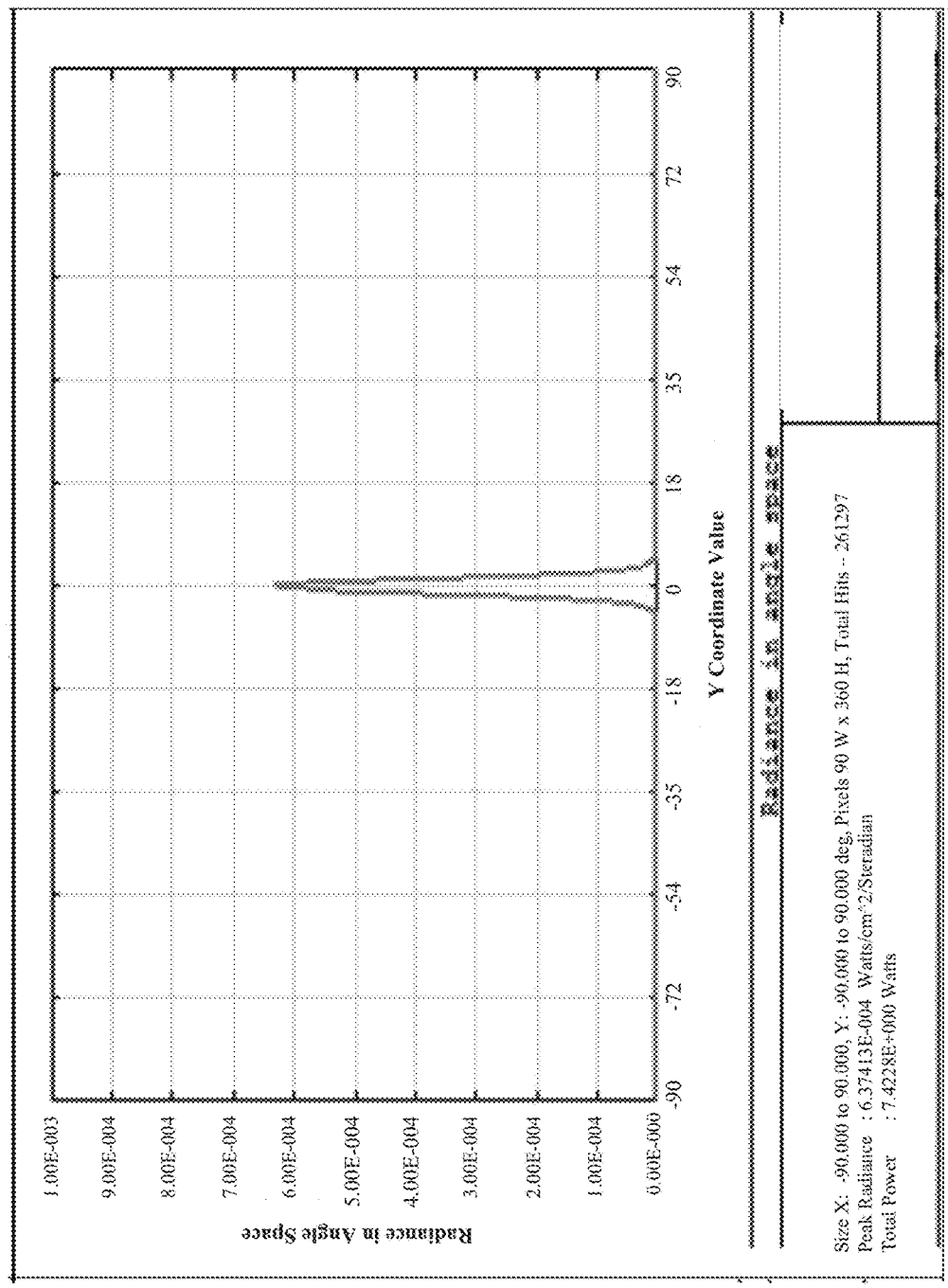
FIG. 8C is a plot of radiance over a vertical cross-section.

FIGS. 8A-8C are plots illustrating a predicted radiance at a distance of one meter from an illuminator comprising a light source device (e.g., a VCSEL light source device) that projects a beam through lens 300. FIG. 8A is a plot of radiance in angle space of −50 degrees to +50 degrees. FIG. 8B is a plot of radiance over the horizontal cross-section. FIG. 8C is a plot of radiance over the vertical cross-section, indicating a narrow beam having an expansion of less than 2 degrees. In the horizontal plane spanning the angle of 50 degrees the homogeneity is at least 85%.

Embodiments of the arched cylindrical Fresnel lens described herein can be fabricated to have a thin light construction, and afford effective light gathering ability that prove useful in a variety of light gathering applications. Example applications in which embodiments of lens 300 can be used include, but are not limited to, condenser systems, emitter/detector architectures, imaging systems, or three-dimensional sensing systems such as time-of-flight cameras. Lens 300 (or elementary units 600 or 700) can also be an integrated component of an industrial optical safety device, such as a laser scanner or a light guard. In such embodiments, lens 300 can be used to efficiently direct light to a monitored industrial area, and a corresponding receiver can detect presence of people or objects within the monitored area based on measurement of the illumination (e.g., by measuring a portion of the illumination reflected from the person or object, or by monitoring the illumination in a through-beam architecture). Embodiments of lens 300 can also be used to direct laser light in laser radar (Lidar) systems.

Figure 9:
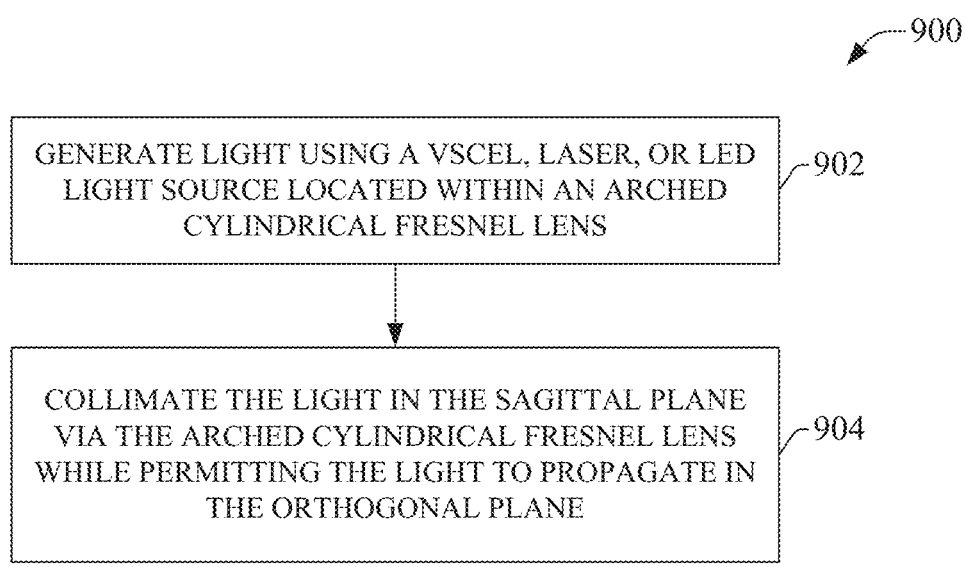
FIG. 9 is a flowchart of an example methodology for projecting a collimated light beam.
Figure 10:
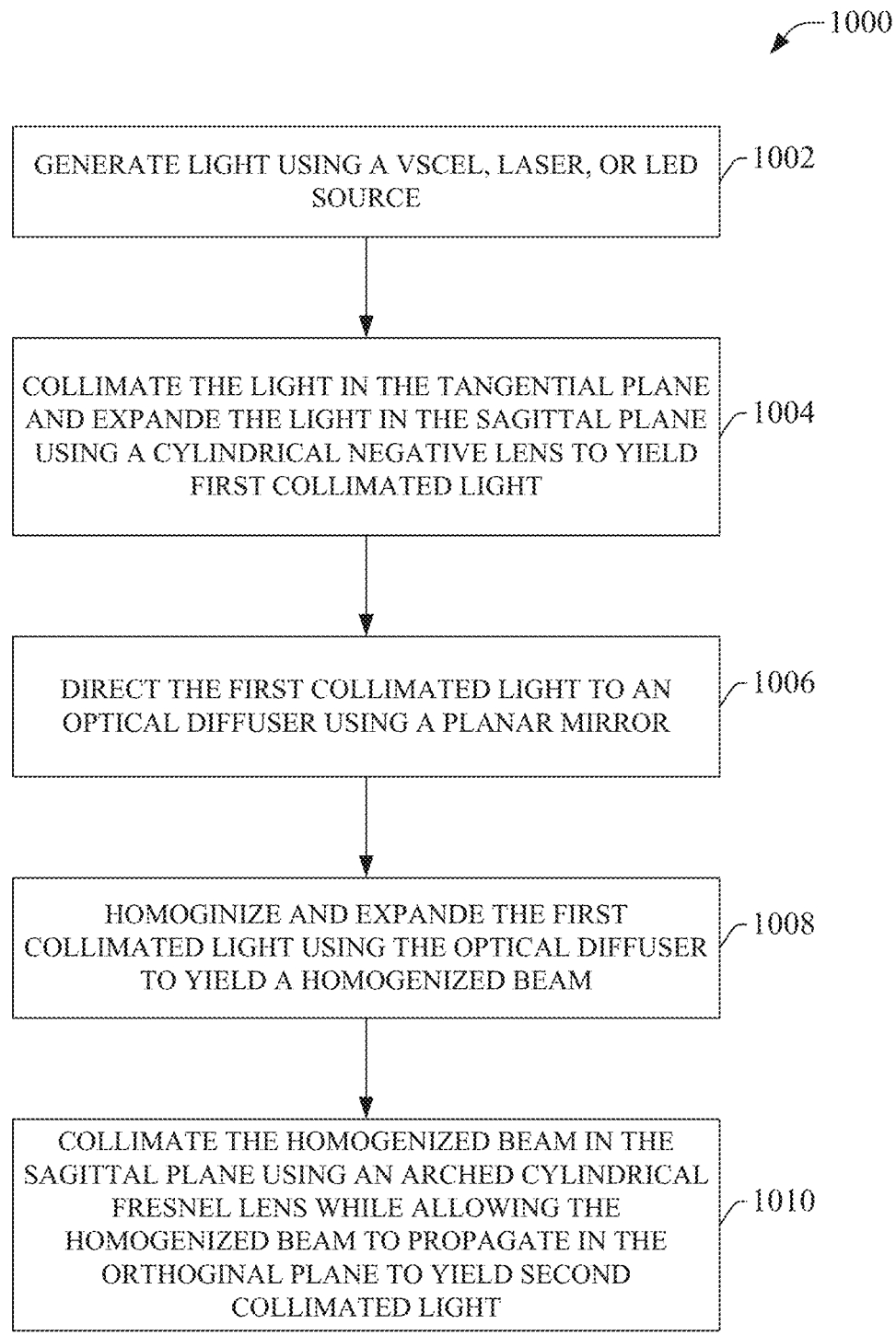
FIG. 10 is a flowchart of an example methodology for processing and projecting light into an illumination field.

FIGS. 9-10 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 9 illustrates an example methodology for projecting a collimated light beam. Initially, at 902, light is generated using a light source device—e.g., a VCSEL, laser, or LED light source—located within an arched cylindrical Fresnel lens. The Fresnel lens can have a curved profile of substantially any arched shape, including but not limited ty cylindrical, elliptical, parabolic, hyperbolic, or a freeform arched shape. At 904, the light generated at step 902 is collimated in the sagittal plane by the arched cylindrical Fresnel lens while being permitted to propagate in the orthogonal plane with little or no refraction of the light rays, thereby yielding an FOI having a disk-like shape (or a disk sector). Collimation by the lens can be achieved using one or more of refractive grooves or diffraction gratings formed on the lens, or by holographic phase patterns formed on a surface of the lens or within the bulk of the lens.

FIG. 10 illustrates an example methodology for processing and projecting light into an illumination field. Initially, at 1002, light is generated using a light source device, such as a VCSEL, laser, or LED light source. At 1004, the light generated at step 1002 is collimated in the tangential plane and expended in the sagittal plane using a cylindrical negative lens to yield first collimated light. The light may alternatively be collected from the light source using biconic lenses. At 1006, the first collimated light is directed to an optical diffuser using a planar mirror. The optical diffuser can be a refractive or diffractive device that scatters and homogenizes the beam in the tangential plane. The diffuser may also comprise two lens arrays set in tandem to one another.

At 1008, the first collimated light is homogenized and expanded using the optical diffuser to yield a homogenized beam. At 1010, the homogenized beam is collimated in the sagittal plane using an arched cylindrical Fresnel lens, which also allows the homogenized beam to propagate in the orthogonal plane to yield second collimated light. Collimation by the lens can be achieved using one or more of refractive grooves or diffraction gratings formed on the lens, or by holographic phase patterns formed on a surface of the lens or within the bulk of the lens.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims. For instance, all the lenses described above may be either refractive lenses, refractive Fresnel lenses, binary lenses, diffractive lenses, holographic optical elements or a combination of such lenses.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A system, comprising:
a lens body that arches about an axis to yield a hollow cylindrical shape, wherein the lens body is refractive or diffractive; and
an illumination system disposed within the lens body, comprising:
a cylindrical negative lens that collimates light from a light source in a tangential plane and expands the light from the light source in a sagittal plane to yield collimated light, and
a planar mirror that directs the collimated light to an optical diffuser, wherein the optical diffuser expands the collimated light to yield an expanded exit beam that is incident on the lens body.

2. The system of claim 1, wherein the lens is configured to collimate the expanded exit beam in a first plane and to allow undisturbed or substantially undisturbed propagation of the expanded exit beam in a second plane that is orthogonal to the first plane.

3. The system of claim 1, wherein the lens body comprises parallel angled grooves that traverse a surface of the lens body along a curved profile of the lens body.

4. The system of claim 1, wherein the lens body comprises a gradient refractive index material.

5. The system of claim 1, wherein a surface of the lens body comprises a binary structure that attributes diffractive optical power.

6. The system of claim 1, wherein the lens body comprises at least one of a volume holographically imprinted phase pattern in a bulk of the lens body or a holographically imprinted phase pattern on a surface of the lens body.

7. The system of claim 1, wherein the lens body comprises a holographically imprinted phase pattern formed on a film with a holographic pattern glue, and the film is affixed to a substrate of the lens body.

8. The system of claim 1, wherein the hollow cylindrical shape comprises a curve profile that is one of circular, elliptical, parabolic, hyperbolic, or free form.

9. An illumination system, comprising:
an arched lens having a curved profile that arches about an axis to yield a hollow cylindrical profile, wherein the arched lens is at least one of diffractive or refractive; and
an illumination source device disposed at or near a focus of the curved profile of the arched lens, the illumination source device comprising:
a cylindrical negative lens that collimates light from a light source in a tangential plane and expands the light from the light source in a sagittal plane to yield collimated light,
an optical diffuser, and
a planar mirror that directs the collimated light to the optical diffuser,
wherein the optical diffuser expands the collimated light to yield an expanded exit beam that is incident on the arched lens.

10. The illumination system of claim 9, wherein the arched lens collimates the expanded exit beam in a first plane and allows propagation of the expanded exit beam in a second plane that is orthogonal to the first plane to yield an output beam.

11. The illumination system of claim 10, wherein
the illumination source device is positioned at or near an intersection of a center-line axis of the cylindrical profile of the arched lens and a tangential plane defined by loci of optical axes of the cylindrical profile, and the output beam is substantially collinear with the tangential plane.

12. The illumination system of claim 10, wherein
the illumination source device is positioned along a center-line axis of the cylindrical profile of the arched lens offset from an intersection between the center-line axis and a tangential plane defined by loci of optical axes of the cylindrical profile, and
the output beam is tilted at an angle relative to the tangential plane.

13. The illumination system of claim 12, wherein
the illumination source device slews along the center-line axis, and
the output beam comprises a conic shape having a tilt angle relative to the tangential plane that is dynamically modulated proportionally to an amplitude at which the illumination source device is slewed.

14. The illumination system of claim 9, wherein
the at least one optical region comprises parallel angled grooves on a surface of the arched lens, and
the parallel angled grooves extend along the curved profile of the arched lens.

15. The illumination system of claim 9, wherein the arched lens comprises a gradient refractive index material.

16. The illumination system of claim 9, wherein a surface of the arched lens comprises a binary structure that attributes diffractive optical power.

17. The illumination system of claim 9, wherein the arched lens comprises at least one of a volume holographically imprinted phase pattern in a bulk of the arched lens or a holographically imprinted phase pattern on a surface of the arched lens.

18. The illumination system of claim 9, wherein the illumination system is a component of at least one of a condenser system, an imaging system, a three-dimensional sensing system, or an industrial optical safety device.

19. A method for producing a beam of light, comprising:
generating light by a light source, wherein the light source is located at or near a focus of a curved profile of a lens, and the generating comprises:
emitting source light by an illumination source,
collimating the source light in a tangential plane and expanding the light in a sagittal plane via a cylindrical negative lens to yield collimated light, and
expanding the collimated light by an optical diffuser to yield the light;
receiving, by the lens, the light generated by a light source; and
collimating, by the lens, the light in a first plane while allowing propagation of the light in a second plane that is orthogonal to the first plane.

20. The method of claim 19, further comprising slewing the light source along a center-line axis of the curved profile of the lens.

* * * * *